(12) United States Patent
Liu et al.

(10) Patent No.: US 12,522,753 B2
(45) Date of Patent: Jan. 13, 2026

(54) RELEASE COATING COMPOSITIONS FOR PRESSURE SENSITIVE ADHESIVE ARTICLES AND METHODS

(71) Applicant: 3M INNOVATIVE PROPERTIES COMPANY, St. Paul, MN (US)

(72) Inventors: Junkang Jacob Liu, Woodbury, MN (US); Christopher A. Merton, St. Louis Park, MN (US); Shawn C. Dodds, St. Paul, MN (US); Siwei Leng, Woodbury, MN (US); Maria A. Appeaning, St. Paul, MN (US); Garry W. Lachmansingh, Plymouth, MN (US); Daniel J. Tipping, Eagan, MN (US)

(73) Assignee: 3M Innovative Properties Company, St. Paul, MN (US)

(*) Notice: Subject to any disclaimer, the term of this patent is extended or adjusted under 35 U.S.C. 154(b) by 450 days.

(21) Appl. No.: 17/603,393

(22) PCT Filed: May 27, 2020

(86) PCT No.: PCT/IB2020/055041
§ 371 (c)(1),
(2) Date: Oct. 13, 2021

(87) PCT Pub. No.: WO2020/245707
PCT Pub. Date: Dec. 10, 2020

(65) Prior Publication Data
US 2022/0177743 A1 Jun. 9, 2022

Related U.S. Application Data

(60) Provisional application No. 62/856,355, filed on Jun. 3, 2019.

(51) Int. Cl.
*C09J 7/40* (2018.01)
*C09J 7/38* (2018.01)

(52) U.S. Cl.
CPC ............ *C09J 7/401* (2018.01); *C09J 7/38* (2018.01); *C09J 2433/005* (2013.01)

(58) Field of Classification Search
None
See application file for complete search history.

(56) References Cited

U.S. PATENT DOCUMENTS 3,011,988 A    12/1961   Luedke
5,527,578 A *   6/1996   Mazurek ............ C08F 290/068
                                                                                                    428/355 R (Continued)

FOREIGN PATENT DOCUMENTS

CN   104327217 A   2/2015
CN   108541267 A   9/2018

(Continued)

OTHER PUBLICATIONS

"Benefits Of Latex Binders For Nonwoven Webs", ASI Adhesives & Sealants Industry, Apr. 2000, [retrieved from the internet on Jan. 24, 2019], URL <https://www.adhesivesmag.com/articles/83839-benefits-of-latex-binders-for-nonwoven-webs> ,6 pages.

(Continued)

*Primary Examiner* — Alexander M Weddle
(74) *Attorney, Agent, or Firm* — Carolyn A. Fischer

(57) ABSTRACT

A method of making a release coated article is described comprising: providing a release coating comprising at least 50 wt. % of monomer(s) comprising an ethylenically unsaturated group and a terminal alkyl group with at least 18 (e.g. contiguous) carbon atoms based on the total amount of ethylenically unsaturated components; crosslinking components(s) comprising at least two ethylenically unsaturated (Continued)

groups; and at least one polymerization initiator. The release coating is substantially solventless, comprising no greater than 1 wt. % of non-polymerizable organic solvent. The method further comprises applying the release coating to a major surface of a substrate; and polymerizing the monomer(s) and crosslinking component(s) of the release coating after applying the release coating to the substrate. Also described are release coating compositions.

19 Claims, 2 Drawing Sheets

(56) References Cited

U.S. PATENT DOCUMENTS

| | | | |
|---|---|---|---|
| 5,700,571 A | 12/1997 | Logue | |
| 6,294,249 B1 | 9/2001 | Hamer | |
| 6,660,354 B2 | 12/2003 | Suwa | |
| 7,816,477 B2 | 10/2010 | Suwa | |
| 9,102,774 B2 | 8/2015 | Clapper et al. | |
| 9,187,678 B2 | 11/2015 | Boardman | |
| 9,475,950 B2 | 10/2016 | Umebayashi | |
| 9,796,885 B2 | 10/2017 | Bartusiak | |
| 9,862,860 B2 | 1/2018 | Hulme et al. | |
| 2003/0134930 A1* | 7/2003 | Gaddam | C08F 8/00 522/149 |
| 2005/0203245 A1* | 9/2005 | Lee | G03G 9/09 524/700 |
| 2006/0141246 A1 | 6/2006 | DiZio | |
| 2007/0112142 A1 | 5/2007 | Beppu et al. | |
| 2009/0000727 A1* | 1/2009 | Kumar | C09J 7/401 156/763 |
| 2009/0196911 A1* | 8/2009 | Loubert | A61P 25/02 424/449 |
| 2013/0045349 A1 | 2/2013 | Kronzer | |
| 2013/0266811 A1 | 10/2013 | Hinterwaldner et al. | |
| 2014/0287642 A1 | 9/2014 | Kumar | |
| 2015/0056757 A1 | 2/2015 | Liu | |
| 2015/0104601 A1* | 4/2015 | Appeaning | C09J 7/385 428/41.4 |
| 2017/0107385 A1 | 4/2017 | Kumai et al. | |
| 2017/0218232 A1* | 8/2017 | Niwa | B32B 29/002 |
| 2018/0312729 A1 | 11/2018 | Hirano et al. | |
| 2020/0208026 A1 | 7/2020 | Niwa et al. | |

FOREIGN PATENT DOCUMENTS

| | | |
|---|---|---|
| EP | 3587526 | 1/2020 |
| GB | 843539 | 8/1960 |
| GB | 1115306 | 5/1968 |
| JP | 2001-123129 A | 5/2001 |
| JP | 2003-327946 | 11/2003 |
| JP | 2003327946 A * | 11/2003 |
| JP | 2019-188639 | 10/2019 |
| WO | WO 2016-171221 | 10/2016 |
| WO | 2018/091768 A1 | 5/2018 |
| WO | WO 2018-091768 | 5/2018 |
| WO | 2022/043786 A1 | 3/2022 |

OTHER PUBLICATIONS

Döhler, "TEGO RC Silicones Introduction", Evonik Nutrition & Care GmbH, Apr. 2017, 48 pages.

"In-line coating with TEGO RC Silicones", Evonik Corporation, Jul. 2017, 16 pages.

Product Bulletin: "Wingtack Resins", Cray Vally USA LLC, Jan. 2010, 12 pages.

Product Comparison: "Lingnin alkali 4710033 & 370959", Sigma-Aldrich, [retrieved from the internet on Mar. 8, 2019], URL <https://www.sigmaaldrich.com/catalog/substance/ligninalkali12345806805111?lang=en&re >, (Date unknown but believed to be prior to the date of the filing of the present application.), 1 page.

Product Overview: "Quintac Series—Products", Zeon Corporation, Apr. 2019, 2 pages.

Product Overview: "TEGO", Evonik Industries, Jul. 2015, 40 pages.

Technical Information: "TEGO Photoinitiator A 18", Evonik Nutrition & Care GmbH, (Date unknown but believed to be prior to the date of the filing of the present application.), 2 pages.

"TEGO RC Silicones Practical Guide", Evonik Industries, Jul. 2015, 36 pages.

International Search Report for PCT International Application No. PCT/IB2020/055041, mailed on Aug. 6, 2020, 5 pages.

"Miramer M180", Miramer M180 is a mono functional aliphatic acrylate, MIWON Specialty Chemical, Technical Data Sheet, 2017, p. 1.

International Search Report for PCT International Application No. PCT/IB2021/056770, mailed on Nov. 8, 2021, 5 pages.

* cited by examiner

RELEASE COATING COMPOSITIONS FOR PRESSURE SENSITIVE ADHESIVE ARTICLES AND METHODS

SUMMARY

Although various release coating compositions have been described; industry would find advantage in new composition that are amenable to solventless manufacturing methods.

In one embodiment, a method of making a release coated article is described comprising: providing a release coating comprising at least 50 wt. % of monomer(s) comprising an ethylenically unsaturated group and a terminal alkyl group with at least 18 (e.g. contiguous) carbon atoms based on the total amount of ethylenically unsaturated components; crosslinking components(s) comprising at least two ethylenically unsaturated groups; and at least one polymerization initiator. The release coating is substantially solventless, comprising no greater than 1 wt. % of non-polymerizable organic solvent. The method further comprises applying the release coating to a major surface of a substrate; and polymerizing the monomer(s) and crosslinking component (s) of the release coating after applying the release coating to the substrate.

Industry would also find advantage in new compositions that are silicone-free or comprise lower concentration of silicone materials since silicone contamination can compromise the performance of a pressure sensitive adhesive. Reducing the silicone concentration can also reduce the cost of the release coating composition.

In one embodiment, the release coating composition comprises the reaction product of at least 65 wt. % of monomer(s) comprising an ethylenically unsaturated group and a terminal alkyl group with at least 18 (e.g. contiguous) carbon atoms based on the total amount of ethylenically unsaturated components; and crosslinking component(s) comprising at least two ethylenically unsaturated groups. In this embodiment, the crosslinking component as well as the total release composition may be free of silicone (e.g. polydiorganosiloxane moieties).

In another embodiment, the release coating composition comprises the reaction product of at least 50 wt. % of monomer(s) comprising an ethylenically unsaturated group and a terminal alkyl group with at least 18 (e.g. contiguous) carbon atoms based on the total amount of ethylenically unsaturated components; and crosslinking component(s) comprising a polydiorganosiloxane backbone at least two ethylenically unsaturated groups. The concentration of silicone crosslinking component is less than 50, 45, or 40 wt. % of the polymerizable components of the release coating.

A wide range of release properties can be provided by the described compositions.

DETAILED DESCRIPTION

Figure 1:
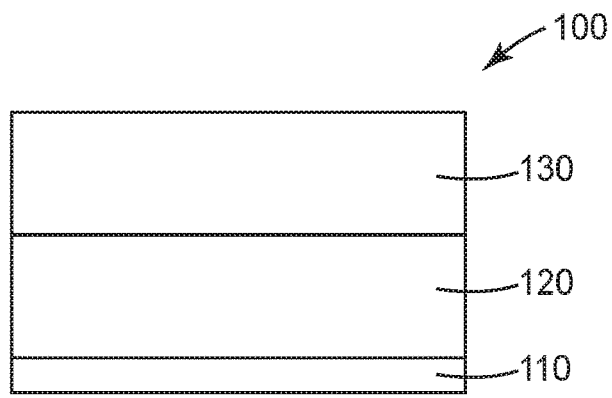
FIG. 1 is a side view of an article including a backing, a release coating on a major surface, and a pressure sensitive adhesive on the opposing major surface of the backing.

The release coating comprises one or more (e.g. free-radically polymerizable) ethylenically unsaturated monomer(s) comprising an alkyl group with at least 18 (e.g. contiguous) carbon atoms. The carbon atoms of the (meth) acrylate group are not included in the number of contiguous carbon atoms. The alkyl group typically comprises no greater than 50 (e.g. contiguous) carbon atoms. In some embodiments, the alkyl group has no greater than 45, 40, 35 or 30 (e.g. contiguous) carbon atoms. Representative examples include octadecyl (meth)acrylate, nonadecyl (meth)acrylate, (meth)eicosanyl acrylate, (meth)behenyl acrylate, and the like. Such monomers typically have a molecular weight no greater than 1000, 900, 800, 700, 600 or 500 g/mole. One representative monomer, octadecyl acrylate is depicted as follows:

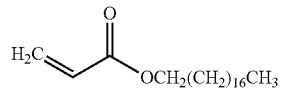

Notably, the alkyl group is a terminal alkyl group. Such alkyl group is also linear, rather than branched. Further, the monomer is a monofunctional ethylenically unsaturated monomer, having a single ethylenically unsaturated (e.g. (meth)acrylate) group. The ethylenically unsaturated group $CH_2=CH-$ is typically bonded to the alkyl group through an ester linking group $-(CO)O-$. However, other divalent or higher valency organic linking groups may be present instead of an ester linkage, provided that the organic linking group does not detract from the crystalline properties of the alkyl moieties having at least 18 (e.g. contiguous) carbon atoms. The at least 18 carbon atoms of the alkyl group are typically contiguous. However, the alkyl group may optionally be interrupted with heteroatoms or other divalent organic linking groups provided that the presence of such heteroatoms does not detract from the crystalline properties of the alkyl moieties. In typical embodiments, acrylate free-radically polymerizable ethylenically unsaturated monomer(s) are favored over methacrylate, especially for solventless manufacturing.

Ethylenically unsaturated monomers comprising at least 18 (e.g. contiguous) carbon atoms are typically solid at room temperature and have a relatively low melting point (i.e. 22, 23, 24, or 25° C.).

One or more ethylenically unsaturated monomers comprising at least 18 (e.g. contiguous) carbon atoms is typically present in a total amount of at least 50 wt. % based on the total (e.g. free-radically polymerizable) ethylenically unsaturated monomer(s) of the release coating composition. The amount of ethylenically unsaturated monomers comprising at least 18 (e.g. contiguous) carbon atoms is typically equal to or greater than the sum of the other polymerizable components of the mixture.

The concentration of one or more ethylenically unsaturated monomers comprising at least 18 (e.g. contiguous) carbon atoms as well as the kinds and amount of crosslinking monomer, and optional other components (e.g. monomers) are selected such that the polymerized release coating has a melting temperature of at least 20, 25, 30, 35, 40, 45, or 50° C. Without intending to be bound by theory, such melting temperature is surmised to be associated with the melt of the (e.g. C18) crystalline side chains. In some embodiments, the (e.g. side chain) melting temperature of the polymerized release coating is typically no greater than 100, 95, 90, 85, 80, 75, 70, 65 or 60° C. The melting temperature can be measured by Differential Scanning calorimetry (DSC) according to the test method described in the example.

In some favored embodiments, the total amount ethylenically unsaturated monomers comprising at least 18 (e.g. contiguous) linear carbon atoms is at least 55, 60, 65, 70, 75, 80, 85, 90, or 95 wt. % of the total ethylenically unsaturated components of the release coating.

In some embodiments, the release coating optionally further comprises other (e.g. free-radically polymerizable) ethylenically unsaturated monomers, oligomers, or polymers. This includes, for example, ethylenically unsaturated monomers comprising a terminal alkyl group comprising 5-17 carbon atoms, polar monomer, aromatic monomer, and silicone components.

In some embodiments, the release coating optionally further comprises ethylenically unsaturated monomers comprising a terminal alkyl group comprising 5-17 carbon atoms. In some embodiments, the terminal alkyl is linear. In other embodiments, the terminal alkyl group is branched. In yet other embodiments, the optional ethylenically unsaturated monomers may comprise a mixture of terminal linear and branched alkyl moieties. Such optional alkyl (meth)acrylate monomer(s) are typically monofunctional, having a single ethylenically unsaturated (e.g. (meth)acrylate) group.

In some embodiments, the optional ethylenically unsaturated monomers comprise at least 10, 11, or 12 carbon atoms. Representative examples include for example lauryl (meth)acrylate, tridecyl (meth)acrylate, tetradecyl (meth)acrylate, pentadecyl (meth)acrylate, hexadecyl (meth)acrylate, heptadecyl (meth)acrylate.

In some embodiments, the optional ethylenically unsaturated monomers comprise less than 10 carbon atoms. Representative examples include methyl (meth)acrylate, ethyl (meth)acrylate, butyl (meth)acrylate, hexyl(meth)acrylate, heptyl(meth)acrylate, octyl(meth)acrylate, and nonyl(meth) acrylate. The release coating can comprise various mixtures of such optional alkyl (meth)acrylate monomers.

The concentration of such optional alkyl (meth)acrylate monomers can vary depending on the structure (e.g. linear or branched) and chain length of the alkyl (meth)acrylate monomers. The kind and amount of alkyl (meth)acrylate monomers is typically selected such that the presence thereof does not detract from the crystalline properties of the polymerized release coating. The concentration of optional alkyl (meth)acrylate monomers is typically less than the concentration of ethylenically unsaturated monomer(s) comprising a terminal alkyl group with at least 18 (e.g. contiguous) carbon atoms. Thus, the concentration of optional alkyl (meth)acrylate monomers is typically less than 50, 45, 40, 35, 30, 25, 20, or 15 wt. % based on the total amount of ethylenically unsaturated components. In some embodiments, the concentration of optional alkyl (meth)acrylate monomers is no greater than 10, 9, 8, 7, 6, 5, 4, 3, 2 or 1 wt. %. In some embodiments, the ethylenically unsaturated monomer(s) comprising a terminal alkyl group with at least 18 (e.g. contiguous) carbon atoms may be purchased from a supplier and due to the purity being less than 100%, it may contain a small concentration of optional alkyl (meth)acrylate monomers.

In some embodiments, the mixture of monomers of the release coating may optionally further comprise a polar monomer such as acrylonitrile, n-vinylpyrrolidone, acrylic acid, methacrylic acid, a $C_1$-$C_4$ alkyl ester of (meth)acrylic acid, and/or hydroxyl-functional $C_1$-$C_4$ alkyl ester of (meth) acrylic acid. In some embodiments, the mixture of monomers of the release coating may optionally further comprise aromatic monomers such as styrene. When present such monomers are typically present in an amount no greater than 10, 9, 8, 7, 6, 5, 4, 3, 2, or 1 wt. % of the total ethylenically unsaturated components of the release coating.

The release coating composition further comprises at least one crosslinking component comprising at least two (e.g. free-radically polymerizable) ethylenically unsaturated groups. The crosslinking component may be a monomer, oligomer, or polymer. In some embodiments, the crosslinking component lacks polydiorganosiloxane moieties. In other embodiments, the crosslinking component comprises polydiorganosiloxane moieties.

In some embodiments, the crosslinking component is a multifunctional ethylenically unsaturated monomer. In some embodiments, the crosslinking monomer comprises at least 3, 4, 5, or 6 (e.g. free-radically polymerizable) ethylenically unsaturated groups. Such crosslinking monomers typically have a molecular weight no greater than 1000 g/mole.

In some embodiments, the crosslinking monomer is not a silicone monomer, oligomer, or polymer. In this embodiment, the release coating can be silicone free. Useful (i.e. silicone-free) multi-(meth)acrylate monomers and oligomers include for example:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate, pentaerythritol triacrylate (commercially available from Sartomer under the trade designation "SR444"), and ethoxylated pentaerythritol triacrylate (from Sartomer under the trade designation "SR494")

(c) higher functionality (meth)acryl monomers such as pentaerythritol tetraacrylate dipentaerythritol pentaacrylate (commercially available from Sartomer under the trade designation "SR399"), ethoxylated pentaerythritol tetraacrylate, dipentaerythritol hexaacrylate, and tris(2-hydroxy ethyl) isocyanurate triacrylate (from Sartomer under the trade designation "SR368".

In some embodiments, the crosslinking component is an oligomeric (meth)acryl monomer such as, for example, urethane acrylates, polyester acrylates, and epoxy acrylates.

Such (meth)acrylate components are available from vendors such as, for example, Sartomer Company of Exton, Pennsylvania; Cytec Industries of Woodland Park, NY; and Aldrich Chemical Company of Milwaukee, Wisconsin Such oligomer (meth)acryl component may have molecular weights ranging up to 5000 to 10,000 g/mole. In some embodiments, the release composition comprises little or no oligomeric (meth)acryl components. In such embodiment, the concentration of oligomeric (meth)acryl components is no greater than 10, 9, 8, 7, 6, 5, 4, 3, 2, or 1 wt. % of the total ethylenically unsaturated components of the release coating.

In some embodiments, the glass transition temperature (Tg) of a homopolymer of the crosslinking component is at least 50, 55, 60, 65, 70 or 75° C. In some embodiments, the Tg of the crosslinking component is no greater than 200° C., 175° C., 150° C., or 100° C.

In some embodiments, the crosslinking monomer comprises one or more ethoxylated groups —($CH_2O$)n- between terminal ethylenically unsaturated (e.g. (meth)acrylate groups.

One favored crosslinking monomer is di(trimethylolpropane) tetraacrylate (molecular weight of 466 g/mole and Tg of 98° C.) commercially available as "EBECRYL 140", depicted as follows:

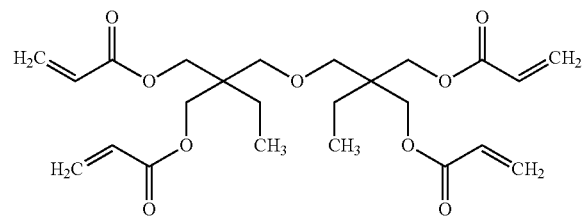 [SMILES: C=CC(=O)OCC(CC)(COCC(CC)(COC(=O)C=C)COC(=O)C=C)COC(=O)C=C]

In some embodiments, the crosslinking component is a silicone oligomer or polymer. The silicone crosslinking components are typically fluids, having a viscosity no greater than 10,000; 5,000; 2,500; or 1,000 mPas at 25° C. For example, silicone crosslinking component commercially available as TEGO™ RC 902 is reported to have a viscosity at 25° C. of 420 mPas. Further, silicone crosslinking component commercially available as TEGO™ RC 711 has a viscosity at 25° C. of 600 mPas. Both of such silicone acrylates have a volatile content of less than 1% and thus the viscosity is a function of the molecular weight and not dilution with an organic solvent.

The silicone crosslinking components comprises a polysiloxane backbone. Such silicone components may be characterized as "functional" in view of comprising (e.g. pendant and or terminal) ethylenically unsaturated (e.g. (meth)acrylate) groups.

In some embodiments, the silicone crosslinking component can be represented by the following formula:

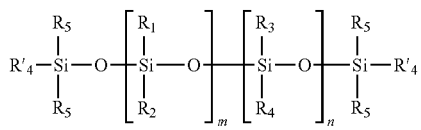

wherein R1, R2, and R3 are independently selected from an alkyl group or an aryl group, R5 is an alkyl group; one or more R4 or R'$_4$ groups comprise an ethylenically unsaturated (e.g. (meth)acrylate) group; and n and m are the number of repeat units. In some embodiments, one or more of the alkyl or aryl groups may contain a halogen substituent, e.g., fluorine. For example, in some embodiments, one or more of the alkyl groups may be —$CH_2CH_2C_4F_9$.

In some embodiments, R1 and R2 are (e.g. methyl) alkyl groups and n is 1, i.e., the material is a poly(dialkylsiloxane). In some embodiments, the alkyl group is a methyl group, i.e., poly(dimethylsiloxane) ("PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly(methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

In some embodiments, R5 and R'4 is a methyl group, i.e., the polydiorganosiloxane crosslinking component is terminated by trimethylsiloxy groups. In this embodiment, n is at least one and R4 comprise an ethylenically unsaturated (e.g. (meth)acrylate) group. Thus, such silicone crosslinking component comprises pendant ethylenically unsaturated (e.g. (meth)acrylate) groups.

In other embodiments, R4 is a methyl group and R'4 comprises ethylenically unsaturated (e.g. (meth)acrylate) group. Thus, such silicone crosslinking component comprises terminal ethylenically unsaturated (e.g. (meth)acrylate) groups.

The R4 or R'4 group may have the formula $CH_2$=CH(CO)O-L- wherein L is a covalent bonded, alkylene, arylene, alkarylene, or arylalkylene.

One of ordinary skill in the art appreciates that the number of dimethylsiloxane repeat groups ("m" of the above representative structure) and pendent acrylate functional groups ("n' of the above representative structure) can also be expressed in terms of molecular weight, as can be determined with Gel Permeation Chromatography (GPC) using polystyrene standards. The number average molecular weight of the polyorganosiloxane crosslinking component is typically at least 200 g/mole, 300 g/mole, or 400 g/mole. In some embodiments, the number average molecular weight is at least 500 g/mole, 700 g/mole, 700 g/mole, 800 g/mole, 900 g/mole, or 1000 g/mole. In some embodiments, the number molecular weight of the polyorganosiloxane crosslinking component is at least 2000 g/mole, 3000 g/mole, 4000 g/mole, or 5,000 g/mole. In some embodiments, the number molecular weight of the polyorganosiloxane crosslinking component is at least 10,000 g/mole or 15,000 g/mole.

In some embodiments, the weight average molecular weight of the polyorganosiloxane crosslinking component is at least 1,000; 2,000; 3,000, 4,000; or 5,000 g/mole. In some embodiments, the weight average molecular weight of the polyorganosiloxane crosslinking component is no greater than 50,000 g/mole; 45,000 g/mole; 40,000 g/mole; 35,000 g/mole; 30,000 g/mole; 25,000 g/mole; or 20,000 g/mol.

In some embodiments, the polydispersity of the polyorganosiloxane crosslinking component typically ranges from 2 to 3.

The silicone crosslinking component is not a mercaptofunctional silicone macromonomer, such as described in US2014/0287642. One of ordinary skill in the art appreciates that although the mercapto group are free-radically polymerizable, such groups are not ethylenically unsaturated and terminate the polymerization through chain transfer.

In some embodiments, the release coating composition may optionally further comprise a silicone macromer has the general formula X—(Y)$_n$SiR$_{(3-m)}$Z$_m$, wherein X is a (meth)acrylate group,
Y is a divalent linking group where n is zero or 1,
m is an integer of from 1 to 3;
R is hydrogen, lower alkyl (e.g., methyl ethyl, or propyl), aryl (e.g., phenyl or substituted phenyl), or alkoxy; and
Z is a monovalent siloxane polymeric moiety having a number average molecular weight above about 1,000 g/mole. The siloxane polymeric moiety lacks functional groups that copolymerize with the (e.g. free-radically polymerizable) ethylenically unsaturated groups of the monomer(s) and crosslinking component(s) of the release coating.

A preferred silicone macromer (as utilized in the examples) has the formula:

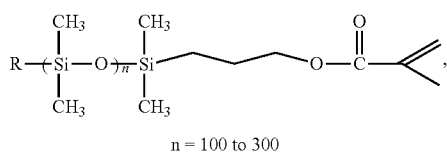

n = 100 to 300 and R is H or an alkyl group.

Combinations of silicone macromers may also be used.

Such silicone macromer are monofunctional and thus are not crosslinking components. When present, such silicone macromers are typically present in an amount no greater than 10, 9, 8, 7, 6, 5, 4, 3, 2, or 1 wt. % of the total (e.g. free radically polymerizable) ethylenically unsaturated components of the release coating.

In some embodiments, the (e.g. release) composition optionally further comprises one or more additives. Additives include for example one or more antioxidants, light (e.g. UV) stabilizers, leveling agents, thermal stabilizers, rheology modifier, colorants, UV or fluorescent dyes, antimicrobial compositions, plasticizers, and the like. The one or more additives typically can be present in the composition in amounts ranging from about 0.01 wt % to 10 wt % based on the total composition and may depend on the type of additive and the final properties of the release coating. In some embodiments, the total amount of additives is no greater than 9, 8, 7, 6, 5, 4, 3, 2, or 1 wt. % of the total solids (i.e. excluding any solvent that may be present) composition.

In some embodiments, the release coating may optionally further comprise a filler. Fillers can be used to reduce the cost or alter the color and/or opacity of the release coating. Useful fillers include, for example, clay, talc, dye and pigment particles and colorants (for example, TiO$_2$ or carbon black), glass beads, metal oxide particles, silica particles, and surface-treated silica particles (such as Aerosil R-972 available from Degussa Corporation, Parsippany, NJ). Typically, filler will be added at a concentration of about 1 or 2 wt. % ranging up to 25 wt. % by weight, based upon the total solids of release coating.

A typical solution polymerization method is carried out by preheating the monomer(s) comprising a terminal alkyl group with at least 18 (e.g. contiguous) carbon atoms above the melt point of the monomer(s), adding the crosslinking component(s) and optional monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature.

Examples of suitable solvents include alkanes (e.g. heptane) and ketones such as acetone and methyl ethyl ketone. Those solvents can be used alone or as mixtures thereof. The amount of organic solvent is typically about 30 to 98 percent by weight (wt. %) based on the total weight of the solution.

Unlike conventional solution polymerization, one embodied method of making a release coated article comprises applying the mixture of unpolymerized monomer(s) and crosslinking component(s), optional solvent, and free radical initiator to a major surface of a substrate. The method further comprises polymerizing the monomer(s) and crosslinking component(s) of the release coating after applying the release coating to the substrate (rather than being polymerized in a reaction vessel).

Thus, the monomer(s) and crosslinking component(s) of the release composition can be polymerized on the substrate by various techniques including, solvent polymerization and solventless bulk polymerization including processes using radiation polymerization. The release composition typically comprises a polymerization initiator, such as a thermal initiator or a photoinitiator of a type and in an amount effective to polymerize the comonomers and crosslinking components(s).

The release compositions described herein may be applied to a substrate (e.g. tape backing) by means of conventional coating techniques such as wire-wound rod, (e.g. direct, kiss, reverse) gravure, 3 roll sand 5 roll coating, air-knife, spray coating, notch-bar coating, knife coating, slot die coating (including application to a tensioned web), immersion dip coating, curtain coating and trailing blade coating.

In some embodiments, the release coating is applied with a gravure coater at volume factors ranging from about 0.5 to 5, 6, 7, 8, 9, or 10 billion cubic microns per square inch. The coating equipment may be heated such that the release composition remains above its melting point. This may include any combination of heated vessels for delivery such as heated tubing, heated pumping elements, heated coating dies/fluid applicators, and heated rolls (e.g. for conveying the substrate). The temperature may be controlled to the same temperature or different temperatures throughout the coating process. The temperature may be controlled by any acceptable means, i.e. resistive heating tape, recirculating fluid (e.g. water, oil), infrared, etc. In some embodiments, the release composition remains above its melting point as it is dispensed onto the substrate. The temperature at which the coating equipment is maintained is typically room temperature (approximately 25° C.), 30° C., 40° C., 50° C., 60° C., or 70° C.

Depending on the coating method, the coating may be a continuous or discontinuous coating. The thickness or mass per area of the release coating can vary. In some embodiments, the coating has a thickness of at least 0.0025 microns (25 nanometers) ranging up to 25 microns. In some embodiments, the discontinuous coating has a mass per area of at least 0.0025 grams per square meter (gsm) ranging up to 25 gsm. In some embodiments, the thickness/mass per area is at least 0.05, 0.1, 0.2, 0.3, 0.4, or 0.5 microns/gsm. In some embodiments, the thickness/mass per area is no greater than 10, 9, 8, 7, 6, or 5 microns/gsm.

In a favored embodiment, polymerization is conducted in the absence of (unpolymerizable) organic solvents and in absence of oxygen (typically achieved by nitrogen inerting). Even though solvent may not affect formation of a crosslinked polymer network, the formation of side chain crystal can be impacted, thus resulting in a coating with different release force properties.

In yet another embodiment, the monomer(s) and crosslinking component(s) of the release coating can be partially polymerized to produce a syrup composition comprising a solute (meth)acrylic polymer dissolved in the (e.g. unpolymerized) monomer(s). Partial polymerization provides a higher viscosity coatable solution of the (meth)acrylic solute polymer in one or more free-radically polymerizable monomers. In some embodiments, polymerization to achieve a coatable viscosity may be conducted such that the conversion of monomers to polymer is up to about 30%. The partially polymerized composition is then coated on a suitable substrate and further polymerized. In this embodiment, the monomer(s) comprising a terminal alkyl group with at least 18 carbon atoms can be partially polymerized prior to adding the crosslinking component(s).

Useful polymerization (e.g. free radical) initiators include those that, on exposure to heat or light, generate free-radicals that initiate (co)polymerization of the mixture of monomer(s) and crosslinking component(s). The initiators are typically employed at concentrations ranging from about 0.0001 to about 3.0 parts by weight, preferably from about 0.001 to about 1.0 parts by weight, and more preferably from about 0.005 to about 0.5 parts by weight of the total polymerizable components.

Suitable thermal initiators include various azo compound such as those commercially available under the trade designation VAZO from Chemours Co. (Wilmington, DE, USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

Useful photoinitiators include benzoin ethers such as benzoin methyl ether and benzoin isopropyl ether; substituted acetophenones; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(0-ethoxy-carbonyl) oxime.

Exemplary substituted acetophenones include 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)), dimethylhydroxyacetophenone, and 2-hydroxy-2-methyl-phenyl-1-propane (TEGO™ Photoinitiator A18). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(0-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio) phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA)).

After applying the polymerizable mixture to the substrate, polymerization of the ethylenically unsaturated monomer(s) and crosslinking component(s) can be accomplished by exposing the (dried solvent-containing, solventless, or syrup) release composition to radiant energy, typically in the presence of a photoinitiator.

In some embodiments, the release composition is exposed to UV radiation. UV light sources can be of various types including relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and relatively high light intensity sources such as medium pressure mercury lamps which provide intensities generally greater than 10 mW/cm$^2$, typically 15 to 450 mW/cm$^2$. The monomer and crosslinking component(s) can also be polymerized with high intensity light sources as available from Fusion UV Systems Inc. UV light to polymerize the monomer and crosslinking component(s) can be provided by light emitting diodes, blacklights, medium pressure mercury lamps, etc. or a combination thereof.

The release coating can be applied to a wide variety of substrates (e.g. tape backings). In some embodiments, the substrate is an organic polymeric film, metal coated film, metallic foil, paper, foam, or (e.g. woven or non-woven) fibrous web. In some embodiments, the substrate is a woven (including knitted) or (e.g. spunbond or melt blown) non-woven fibrous web, such as typically used for backings of medical tapes and dressings. In some embodiments, the substrate is paper that may include a coating, such as those used for release liners, masking tapes, and self-stick note pads.

Suitable polymeric films include, for example, polyester films such as polyethylene terephthalate (PET), polylactic acid (PLA) and polyethylene naphthalate (PEN); polyolefin films such as polyethylene and polypropylene (e.g. biaxial oriented polypropylene BOPP); polyamide films such as nylon; polyimide films such as KAPTON (available from DuPont deNemours Corp., Wilmington, Del.); cellulose acetate; polyvinylchloride; polytetrafluoroethylene and the like.

In some embodiments, the thickness of the substrate is at least 0.5, 1 or 2 mils and typically no greater than 5, 10 or 15 mils.

One or both major surfaces of the substrate (e.g. backing) may further comprise a primer layer or be surface treated (e.g. corona treated), as known in the art to promote adhesion of the release coating, adhesive or both.

The resulting PSA articles may be a tape, label, or wound dressings. The adhesive articles may be in the form of a sheet, multilayer sheet, or stack of sheets (e.g. note pad, easel pad, label pad, tape stack), or in the form of a roll, such as a roll of tape.

One illustrative PSA article 100 is shown in FIG. 1. This embodied (e.g. tape) article comprise release coating 110 disposed on a major surface of substrate (e.g. backing) 120 and a pressure sensitive adhesive 130 disposed on the opposing major surface of 120.

Figure 2:
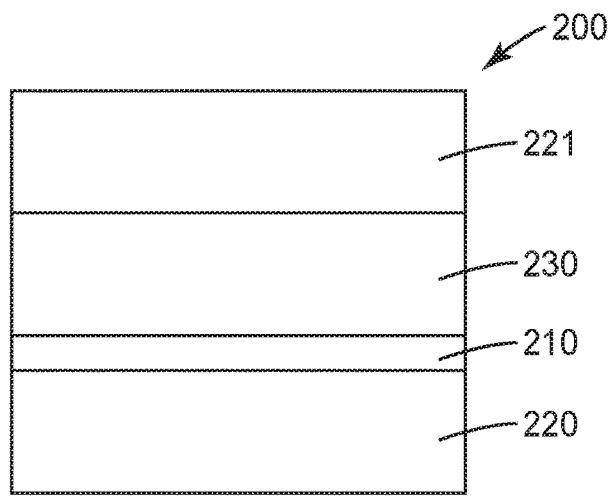
FIG. 2 is a side view of another article comprising a release coated backing and a separate pressure sensitive adhesive coated substrate.

FIG. 2 depicts another PSA article 200. This embodied article comprising a release coating 210 disposed on a major surface of substrate (e.g. backing) 220. A pressure sensitive adhesive 230 is releasably bonded to the release coating 210. The pressure sensitive adhesive is disposed on a major surface of a second substrate 221.

Figure 3:
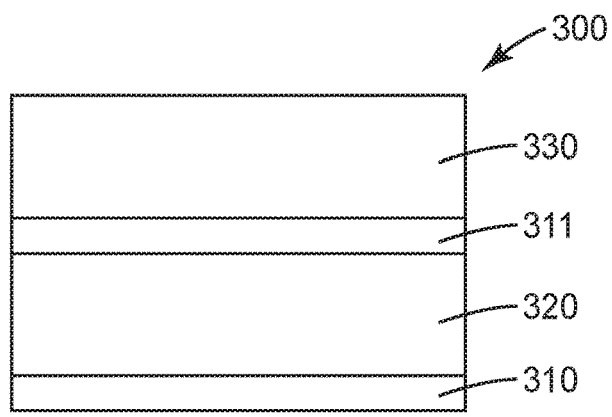
FIG. 3 is a side view of another article comprising a backing with release coating on both major surfaces and a pressure sensitive adhesive between the release-coated surfaces.
Figure 4:
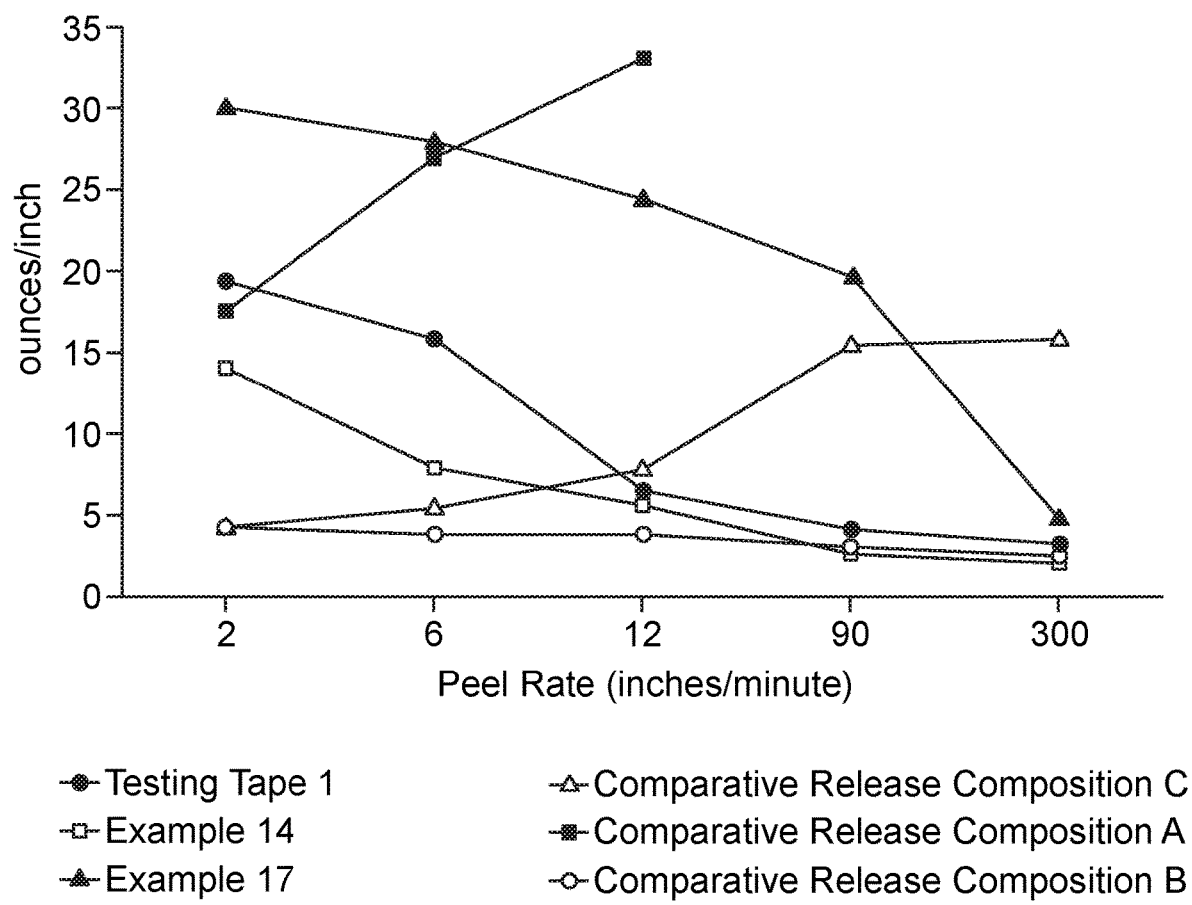
FIG. 4 is a plot of release force as a function of peel rate of comparative and inventive release compositions.

FIG. 3 depicts another PSA article 300. This embodied (e.g. tape) article comprises release coatings 310 and 311 disposed on both major surfaces of substrate (e.g. backing) 320 and a pressure sensitive adhesive 330 releasably bonded to release coating 311. One or both of release coatings 310 and 311 are a release coating as described herein.

The release coating described herein is suitable for use with a wide variety of pressure sensitive adhesive compositions. Suitable (e.g. pressure sensitive) adhesives include natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3 \times 10^6$ dynes/cm at a frequency of 1 Hz.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive. The heat activatable adhesives can be prepared from the same classes as previously described for the pressure sensitive adhesive. However, the components and concentrations thereof are selected such that the adhesive is heat activatable, rather than pressure sensitive, or a combination thereof.

In some embodiments, the organic solvent is removed from the pressure sensitive adhesive prior to contacting the adhesive with the release coating described herein. In some embodiments, the hot melt adhesive is contacted with the release coating at a temperature below the melt temperature of the release coating composition. Exposure to organic solvent or heat can disrupt the crystallization of the side chains and thereby alter the release properties. For example, after exposure the coating can function as a primer or adhesion promoter, rather than a release coating.

The pressure sensitive adhesive may further include one or more suitable additives according to necessity. The additives are exemplified by crosslinking agents (e.g. multifunctional (meth)acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The release composition can exhibit the following release properties with a variety of different adhesive compositions of commercially available tapes. In some embodiments, the release properties described herein were determined with Testing Tape 1, having a 25 micron thick layer of hot melt adhesive comprising a mixture of 100 parts of SIS block copolymer (having a styrene content of 14.3%, a coupling efficiency of 88% and a melt index of 9 g/10 min (condition G)), 85 parts of tackifying resin (C9 modified C5 having a softening point of 87° C.) and 2 parts of antioxidant disposed on a 50 micron thick of corona treated BOPP film.

The average initial release force of the release coating can generally range from 1 ounce/inch to 15 ounces/inch (11.16 to 167.4 g/cm) at a peel rate of 2 inches (5 cm)/min.

In some embodiments, the average initial release force is at least 2, 3, 4, 5, 6, or 7 (22.3, 33.5, 44.6, 55.8, 78.1 g/cm) ounces/inch at a peel rate of 2 inches (5 cm)/min. A higher average initial release force at slower peel rates can be preferred in some embodiments to prevent a roll of tape from self-unwinding or to provide greater holding power when over taping occurs such as for packaging tape and medical tape.

In some embodiments, the average initial release force is no greater than 7 (78.1 g/cm), 6 (67 g/cm), 5 (55.8 g/cm), 4 (44.6 g/cm), or 3 (33.5 g/cm) ounces/inch at a peel rate of 2 inches (5 cm)/min.

In some embodiments, the release coating can provide a decrease in release force as the peel rate increase from 2 to 300 inches/minute (5 to 762 cm/minutes). Such decrease can be expressed by a ratio of the release force at 2 inches (5 cm)/minute divided by the release force at 90 inches (228 cm)/minute. In some embodiments, the ratio is at least 1.5, 2, 2.5, 3, 3.5, 4, 4.5, or 5.

In other embodiments, the release force of the release coating increases as the peel rate increase from 2 to 300 inches/minute. Such increase can be expressed by a ratio of the release force at 2 inches/minute divided by the release force at 90 inches/minute. In some embodiments, the ratio is less than 0.5.

In some embodiments, the release composition may be utilized as a low adhesion backsize (LAB) of a tape. In such embodiments, a release coating composition may be selected having lower unwind (initial release or aged release force) at higher peel rates.

In some embodiment, the release composition may be utilized as a replacement for the low adhesion backsize of commercially available tape or a testing tape. For example, in one embodiment, it may be preferred for the release coating to exhibit an average initial release force of less than 2 or 3 ounces/inch (22-33 g/cm) and an aged release force of less than 7 ounces/inch (78 g/cm) after aging for 7 days 50° C. Further, in this embodiment it may be preferred for the release coating to exhibit an average initial release force and after aging for 7 days 50° C. of greater than or equal to 50 ounces/inch (558 g/cm). In some embodiments, the release coating exhibits improved performance evident by a lower increase of aged release force. For example, the release coating of Testing Tape 1 exhibits an increase of aged release force of about 250%. In contrast, release compositions of the present invention can exhibit an increase of aged release force of no greater than 200, 150, 100, 50% and even no increase of aged release force.

It is appreciated that different release compositions are preferred for different pressure sensitive adhesive compositions. It is also appreciated that different types of adhesive articles have different preferred release properties.

In some embodiments, the release coating may exhibit a shocky release, meaning that that the peak release force differs from the average release force by at least 200%.

EXAMPLES

Unless otherwise noted or readily apparent from the context, all parts, percentages, ratios, etc. in the Examples and the rest of the specification are by weight.

TABLE 1

Materials Used in the Examples

| Abbreviation | Description and Source |
|---|---|
| M180 | Octadecyl acrylate obtained under the trade designation MIRAMER M180 from Miwon, GYEONGGI-DO, Korea |
| M1220 | Docosyl acrylate obtained under the trade designation MIRAMER M1220 from Miwon |
| M160 | Hexadecyl acrylate obtained under the trade designation MIRAMER M160 from Miwon |
| E140 | Ditrimethylol Propane Tetraacrylate obtained under the trade designation EBECRYL 140 from Cytec, Woodland Park, NJ |
| RC902 | Silicone acrylate obtained under the trade designation TEGO RC902 from Evonik, Richmond, VA |
| RC711 | Silicone acrylate obtained under the trade designation TEGO RC711 from Evonik |
| A18 | Radical initiator obtained under the trade designation TEGO PHOTOINITIATOR A18 from Evonik |
| Q3620 | SIS block copolymer having a styrene content of 14.3%, a coupling efficiency of 88% and a melt index of 9 g/10 min (condition G) obtained under the trade designation QUINTAC 3620 from Zeon, Tokyo, Japan |
| W86 | C9 modified C5 tackifying resin having a Ring and Ball Softening point of 87° C. available from Cray Valley, Exton, PA as the trade designation "WINGTACK ™ 86" |
| 3SAC | Primed PET obtained under the trade designation HOSTAPHAN 3SAC from Mitsubishi Polyester Film, Greer, SC |
| 4507 | Primed PET obtained under the trade designation HOSTAPHAN 4507 from Mitsubishi Polyester Film |
| BOPP | 1.3 mil (0.03 millimeters) biaxial oriented polypropylene film from 3M Co., Maplewood, MN |
| Easel Paper | 3.7 mil paper, 70 gsm |
| Masking tape 232 | Natural rubber adhesive tape obtained under the trade designation 3M 232 MASKING TAPE from 3M Co. |
| Packaging tape 3750 | Hot melt adhesive tape obtained under trade designation SCOTCH PREMIUM HEAVY-DUTY PACKAGING TAPE 3750 CLEAR-TO-CORE from 3M Co. |
| Box sealing tape 373 | Synthetic rubber adhesive tape obtained under the trade designation SCOTCH BOX SEALING TAPE 373 from 3M Co. |
| Office tape 812 | Acrylic adhesive office tape obtained under trade designation SCOTCH 812 MAGIC GREENER TAPE from 3M, St. Paul, MN, US |

Test Methods

Release Force and Re-Adhesion Testing

This peel adhesion test is similar to the test method described in ASTM D3330-180 (edited 04-2018). For each test, a 24 millimeter (mm) wide and 6 inch (15.24 centimeter (cm)) long strip of testing tape was adhered to the release layer of a release coated backing (in the comparative examples, this is the release coating of the testing tape), prepared as described in the example section below, using a 2 kilogram (kg) hard rubber roller passed back and forth once over the strip. The assembled sample was attached to a stainless-steel (SS) plate by double-sided tape with the testing tape exposed on the top level.

The assembly was tested right after the sample was prepared (initial) or was allowed to dwell for 1 week at 50° C. (heat aged).

The release force was measured using a commercially available IMASS slip/peel tester (Model 3000, Instrumentors Inc., Strongsville, OH) at a peel angle of 180° and a peel rate of 2.3 meters/minute (90 inches/minute), unless specified otherwise.

Re-adhesion values were measured by taking the tapes peeled from the release surface and rolling them adhesive side down onto a clean stainless-steel plate with a surface roughness of 1.5+/−0.5 microinch using a 2-kilogram hard rubber roller passed back and forth once over the strip. The re-adhesion samples were then peeled on the IMASS slip/peel tester at a peel angle of 180° and a peel rate of 2.3 meters/minute.

The force (oz/inch) recorded is an average value over 5 seconds of peeling time after a 0.5 sec delay. This was repeated for two samples and the average of the two values is reported in the tables.

Melting Temperature

The Differential Scanning calorimeter (DSC) test method is similar to the test method described in ASTM D3418-15 (approved May, 2018). A Mettler Toledo Differential Scanning calorimeter (DSC 3+, Columbus, OH) with a liquid nitrogen tank was used to characterize the thermal properties of the phase transitions. The temperature and heat flow scales were calibrated as described in the DSC 3+ reference manual. The release coating layer was cut off and tested with the substrate. The specimens were analyzed using a heat-cool-heat method in dynamic mode, such as 10 to 80° C. at 10° C./minute under nitrogen atmosphere. The transition melting temperatures were determined by measuring peak temperatures from the cooling and heating experiments. The reported melting temperatures were measured from the first heat cycle, unless specified otherwise.

Coating and Curing Method 1 (C&C Method 1)

The solventless mixture was kept at 50° C. and coated on a backing (according to Table 2) through a gravure coater equipped with a heated cylinder with a various volume factor ranging from 0.6 to 2.6 billion cubic micrometers (BCM) per square inch (according to Table 2), backup roll, and heated applicator. The coated mixture was cured by irradiating the coated backing with a commercially available UV curing system using an ultraviolet (UV) lamp (Light-Hammer Mk2 with type H bulb and aluminum reflector obtained from Fusion UV Systems Inc., Gaithersburg, MD) at 600 Watts/inch (236 Watts/cm) while moving the web at a speed ranging from 20 to 500 feet/minute (fpm) (6.10 to 152.40 meters/minute (m/min)) (according to Table 2). The UV source had a heated backing roll maintained at 50° C. For curing, the oxygen level was less than 50 to 100 parts per million (ppm).

Coating and Curing Method 2 (C&C Method 2)

The solventless mixture was kept at 50° C. and coated on a film (according to Table 2) with a #3 Meyer rod. Then the coated sample was immediately cured by irradiating with an ultraviolet (UV) lamp (microwave medium pressure mercury, VPS with 1600 irradiator, type H bulb with aluminum reflector, obtained from Fusion UV Systems Inc., Gaithersburg, MD) at 600 Watts/inch (236 Watts/cm) while moving the web at 60 fpm (18.29 meters/minute). For curing, the oxygen level was less than 50 to 100 ppm.

Coating and Curing Method 3 (C&C Method 3)

One part of the mixture was dissolved in five parts of heptane. The release coating solution was hand coated onto a film (according to Table 2) using a #3 Meyer Bar. After the coated sample was naturally dried, it was cured by irradiating with an ultraviolet (UV) lamp (microwave medium pressure mercury VPS with 1600 irradiator with type H bulb and aluminum reflector obtained from Fusion UV Systems Inc., Gaithersburg, MD) at 600 Watts/inch (236 Watts/cm) while moving the web at 60 feet/minute (fpm) (18.29 meters/minute). For curing, the oxygen level was less than 50 to 100 ppm.

Coating and Curing Method 4 (C&C Method 4)

25 grams (g) of the mixture was added to 100 g of heptane. The solution was solvent coated on a film (according to Table 2) through a micro gravure roll with 250 lines, dried in an air flow oven at 125° C., and cured by irradiating the coated PET film with an ultraviolet (UV) lamp (microwave medium pressure mercury, VPS power supply with 1600 irradiator with aluminum reflector, type H bulb obtained from Fusion UV Systems Inc., Gaithersburg, MD) at 390 Watts/inch (153 Watts/cm) (65% power) while moving the web at 10 fpm (3.05 meters/minute). The UV source had a heated backing roll maintained at 50° C. For curing, the oxygen level was less than 50 to 100 ppm.

Examples and Comparative Examples

Testing Tape 1 was prepared by hotmelt continuous coating at about 25 micron thick of a synthetic rubber based adhesive mixture comprising 100 parts of Q3620, 85 parts of W86, and 2 parts of antioxidant onto a 50 micron thick of corona treated BOPP film. The opposite side of the BOPP film was then coated with a solvent based comparative release coating and dried.

Comparative Example 1 was the release coating on Testing Tape 1.

Comparative Example 2 was the uncoated PET film.

Comparative Example 3 was the uncoated BOPP film.

The mixtures described in the examples below were prepared by adding all of the components into a jar and heating the jar up to 50° C. Once 50° C. was reached, the jar was capped and mixed with a magnetic stir bar.

Examples 1-13 were prepared by mixing components and amounts according to Table 2. The mixed solutions were then coated and cured according to the C&C Method listed in Table 2.

Using the adhesive side of Testing Tape 1, Comparative Examples 1, 2, and 3 and Examples 1-13 were tested for release force and re-adhesion force to a clean stainless-steel plate according to the Test Methods described above. Results are provided in Table 3.

Comparative Example 2, Comparative Example 3, and Examples 1-13 were also tested for release force and re-adhesion force using a different test tape, i.e. Making Tape 232 according to the Test Methods described above. Results are provided in the Table 4.

TABLE 3

Release force and re-adhesion force results

| Testing Tape 1 on: | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| Comparative Example 1, Target Performance | ≤2.57 (≤28.7) | ≤6.62 (≤69.9) | ≥57.87 (≥645.9) | ≥55.25 (≥616.7) |
| EX 1 | 1.7 (19.0) | 35.7 (398.4) | 64.1 (715.4) | 31.9 (356) |
| EX 2 | 1.8 (20.1) | 2.5 (27.9) | 60.2 (671.8) | 60.0 (669.6) |
| EX 3 | 2.0 (22.3) | 3.1 (34.6) | 64.8 (723.2) | 62.0 (691.9) |
| EX 4 | 2.2 (24.6) | 2.8 (31.2) | 63.8 (712.0) | 62.1 (693.0) |
| EX 5 | 3.5 (39.1) | 11.6 (129.5) | 65.8 (734.3) | 60.1 (670.7) |
| EX 6 | 2.1 (23.4) | 20.7 (231) | 62.6 (698.6) | 40.6 (453) |
| EX 7 | 3.1 (34.6) | 30.0 (335) | 53.4 (595.9) | 36.2 (404) |
| EX 8 | 2.8 (31.2) | 2.6 (29.0) | 52.9 (590.4) | 54.4 (607.1) |
| EX 9 | 1.5 (16.7) | 3.5 (39.1) | 58.1 (648.4) | 52.2 (582.6) |
| EX 10 | 1.6 (17.9) | 2.3 (25.7) | 62.5 (697.5) | 57.0 (636.1) |
| EX 11 | 2.2 (24.6) | 6.9 (77.0) | 58.3 (650.6) | 56.7 (632.8) |
| EX 12 | 2.0 (22.3) | 6.1 (68.1) | 58.7 (655.1) | 50.0 (558.0) |
| EX 13 | 2.1 (23.4) | 12.9 (144.0) | 62.8 (700.8) | 56.7 (632.8) |
| Comparative Example 2 - No release coating on uncoated PET film | >60 (>669.6) | >60 (>669.6) | N/A | N/A |
| Comparative Example 3 - No release coating on uncoated BOPP film | >40 (>446.4) | >60 (>669.6) | N/A | N/A |

N/A = not applicable

TABLE 2

Formulations and coating and curing conditions

| Testing Tape 1 on: | M180, wt % octadecyl acrylate | E140, wt % crosslinking monomer | RC711, wt % crosslinking monomer | RC902, wt % crosslinking monomer | A18 initiator, wt % total composition | Film | Coating Thickness, μm | C&C Method | Cylinder volume factor, BCM | Cure Speed, fpm (m/minute) |
|---|---|---|---|---|---|---|---|---|---|---|
| EX 1 | 91.8 | 8.2 | 0.0 | 0.0 | 2 | BOPP | 0.1 | 1 | 0.6 | 60 (18.29) |
| EX 2 | 83.7 | 8.2 | 8.2 | 0.0 | 2 | BOPP | 0.1 | 1 | 0.6 | 60 (18.29) |
| EX 3 | 83.7 | 8.2 | 8.2 | 0.0 | 2 | BOPP | 0.5 | 1 | 2.6 | 100 (30.48) |
| EX 4 | 83.7 | 8.2 | 8.2 | 0.0 | 2 | BOPP | 0.5 | 1 | 2.6 | 200 (60.96) |
| EX 5 | 83.7 | 8.2 | 0.0 | 8.2 | 2 | 3 SAC | 0.2 | 1 | 0.6 | 60 (18.29) |
| EX 6 | 91.8 | 8.2 | 0.0 | 0.0 | 2 | 3 SAC | 0.5 | 1 | 2.6 | 300 (91.44) |
| EX 7 | 91.8 | 8.2 | 0.0 | 0.0 | 2 | 3 SAC | 0.5 | 1 | 2.6 | 500 (152.40) |
| EX 8 | 50.0 | 10.0 | 40.0 | 0.0 | 2 | 3 SAC | 3 | 2 | N/A | 60 (18.29) |
| EX 9 | 70.0 | 10.0 | 20.0 | 0.0 | 2 | 3 SAC | 3 | 2 | N/A | 60 (18.29) |
| EX 10 | 80.0 | 10.0 | 10.0 | 0.0 | 2 | 3 SAC | 3 | 2 | N/A | 60 (18.29) |
| EX 11 | 50.0 | 10.0 | 40.0 | 0.0 | 2 | 3 SAC | 0.05 | 3 | N/A | 60 (18.29) |
| EX 12 | 70.0 | 10.0 | 20.0 | 0.0 | 2 | 3 SAC | 0.05 | 3 | N/A | 60 (18.29) |
| EX 13 | 90.0 | 0.0 | 10.0 | 0.0 | 2 | 3 SAC | 0.05 | 3 | N/A | 60 (18.29) |

N/A = not applicable

TABLE 4

Release force and re-adhesion force results

| Masking Tape 232 on: | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| Masking Tape 232, Target Performance | ≤17.35 (≤193.6) | ≤28.65 (≤319.8) | ≥35.08 (≥391.5) | ≥33.65 (≥375.6) |
| EX 1 | 4.1 (45.8) | 41.1 | 46.1 (514.5) | 39.9 |
| EX 2 | 5.8 (64.7) | 23.8 (265.6) | 44.0 (491.0) | 47.4 (529.0) |
| EX 3 | 6.0 (67.0) | 26.9 (300.2) | 47.4 (529.0) | 43.9 (489.9) |

TABLE 4-continued

Release force and re-adhesion force results

| Masking Tape 232 on: | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| EX 4 | 8.3 (92.6) | 33.3 (371.6) | 47.2 (526.8) | 44.1 (492.2) |
| EX 5 | 4.4 (49.1) | 20.1 (224.3) | 44.1 (492.2) | 44.8 (500.0) |
| EX 6 | 15.6 (174.1) | 41.1 (459) | 44.7 (498.9) | 32.7 (365) |
| EX 7 | 18.0 (200.9) | 41.0 (458) | 37.2 (415.2) | 30.4 (339) |
| EX 8 | 6.5 (72.5) | 13.4 (149.5) | 32.5 (362.7) | 43.1 (481.0) |
| EX 9 | 7.2 (80.4) | 20.0 (223.2) | 32.5 (362.7) | 33.1 (369.4) |
| EX 10 | 0.9 (10.0) | 2.1 (23.4) | 38.5 (429.7) | 39.8 (444.2) |
| EX 11 | 9.1 (101.6) | 19.4 (216.5) | 34.7 (387.3) | 29.0 (323.6) |
| EX 12 | 9.2 (102.7) | 23.8 (265.6) | 34.8 (388.4) | 35.0 (390.6) |
| EX 13 | 12.6 (140.6) | 28.9 (322.5) | 36.1 (402.9) | 31.7 (353.8) |
| Comparative Example 2 - No release coating on uncoated PET film | >60 (>669.6) | >60 (>669.6) | N/A | N/A |
| Comparative Example 3 - No release coating on uncoated BOPP film | >60 (>669.6) | >60 (>669.6) | N/A | N/A |

N/A = not applicable

These same release coatings were coated on a nonwoven backing of a medical tape. The coated PET, BOPP, and nonwoven backings were tested with a variety of other testing tapes including 3M™ Kind Removal Silicone Tape 2770 having a silicone adhesive, Scotch Book Tape 845 having an acrylic adhesive, Scotch LONG LASTING MOVING AND STORAGE PACKAGING TAPE 3650 and SCOTCH HEAVY DUTY SHIPPING PACKAGING TAPE 3850. One or more of the release coating compositions provided suitable release force (i.e. less than or equal to the test tape) and suitable readhesion (greater than or equal to the test tape).

Comparative Example 9, Comparative Example 10, and Examples 14 to 18 were prepared by mixing components and amounts according to Table 5. The mixed solutions were then coated and cured according to the C&C Method 4. The resulting release coating had a thickness of about 300 nm.

Using the adhesive side of masking tape 232, Comparative Examples 4, Comparative Example 5, and Examples 14-18 were tested for release force and re-adhesion force to a clean stainless-steel plate according to the Test Methods described above. Results are provided in Table 6:

TABLE 5

Formulations and coating and curing conditions

| | M160, wt % hexadecyl acrylate | M180, wt % octadecyl acrylate | M1220, wt % docosyl acrylate | E140, wt % polymerizable material | A18, wt % total composition | Film |
|---|---|---|---|---|---|---|
| Comparative Example 4 C16 alkyl group | 91.8 | 0.0 | 0.0 | 8.2 | 2 | 4507 |
| EX 14 | 0.0 | 91.8 | 0.0 | 8.2 | 2 | 4507 |
| EX 15 | 0.0 | 0.0 | 91.8 | 8.2 | 2 | 4507 |
| EX 16 | 0.0 | 67.3 | 0.0 | 32.7 | 2 | 4507 |
| EX 17 | 0.0 | 83.7 | 0.0 | 16.3 | 2 | 4507 |
| EX 18 | 0.0 | 95.9 | 0.0 | 4.1 | 2 | 4507 |
| Comparative Example 5 No crosslinker | 0.0 | 100.0 | 0.0 | 0.0 | 2 | 4507 |

TABLE 6

Release force and re-adhesion force results

| Masking tape 232 on: | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| Masking Tape 232, Target Performance | ≤17.35 (≤193.6) | ≤28.65 (≤319.8) | ≥35.08 (≥391.5) | ≥33.65 (≥375.6) |
| Comparative Example 4 C16 alkyl group | 35.0 (390.6) | 51.4 (574) | 23.9 (266.7) | 31.1 (347) |
| EX 14 | 11.6 (129.5) | 41.0 (457.6) | 27.2 (303.6) | 34.4 (383.9) |
| EX 15 | 7.0 (78.1) | 34.8 (388) | 28.2 (314.7) | 27.4 (306) |
| EX 16 | 36.7 (409.6) | 53.9 (602) | 25.6 (285.7) | 30.3 (338) |
| EX 17 | 22.8 (254.4) | 45.0 (502) | 27.1 (302.4) | 30.4 (339) |
| EX 18 | 24.8 (276.8) | 39.1 (436) | 24.6 (274.5) | 32.2 (359) |
| Comparative Example 5 No crosslinker | 7.1 (79.2) | 43.4 (484.3) | 30.6 (341.4) | 31.1 (347.1) |

Using the adhesive side of Testing Tape 1, Comparative Examples 4, Comparative Example 5, and Examples 14-18 were tested for release force and re-adhesion force to a clean stainless-steel plate according to the Test Methods described above. Results are provided in the Table 7.

TABLE 7

Release force and re-adhesion force results

| Test tape 1 on: | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| Comparative Example 1, Target Performance | ≤2.57 (≤28.7) | ≤6.62 (≤73.9) | ≥57.87 (≥645.9) | ≥55.25 (≥616.7) |
| Comparative Example 4 | 58.1 (648.4) | 65.1 | 33.8 (377.2) | 50.0 |
| EX 14 | 3.5 (39.1) | 6.2 (69.2) | 43.9 (489.9) | 59.2 (660.7) |
| EX 15 | 1.8 (20.1) | 2.8 | 44.3 (494.4) | 61.3 |
| EX 16 | 58.0 (647.3) | 62.4 | 32.6 (363.8) | 47.9 |
| EX 17 | 9.1 (101.6) | 35.5 | 41.7 (465.4) | 53.4 |
| EX 18 | 8.6 (96.0) | 7.2 | 41.4 (462.0) | 50.6 |
| Comparative Example 5 | 1.6 (17.9) | 58.7 (655.1) | 49.2 (549.1) | 42.2 (471.0) |

Examples 4, 6-9, and 15 were further tested for by DSC using the Test Method described above. A melt temperature surmised to be the melting point of the (e.g. C18) side chains was recorded. The test results are provided in the Table 8 below.

TABLE 8

Phase change temperature

| EXAMPLE | Melt temperature, ° C. |
|---|---|
| EX 4 | 37.7 |
| EX 6 | 40.6 |
| EX 7 | 39.2 |
| EX 8 | 25.5 |
| EX 9 | 41.6 |
| EX 15 | 61.2 |

Using the adhesive side of Testing Tape 1, Comparative Examples and Examples 4, 7, 14, 15, and 17 were tested for release force at different peel (removal) rates, the test method was the same as described above). Results are reported in Table 9.

TABLE 9

Release force results at different peel rates

| Testing Tape 1 on: | Peel rate, inch/minute (cm/minute) | | | | | | Ratio of 2 inch/minute (5 cm/minute) to 90 inch/minute (229 cm/minute) |
|---|---|---|---|---|---|---|---|
| | 2 (5) | 6 (15) | 12 (30) | 90 (229) | 127 (323) | 300 (762) | |
| | Release force, oz/in (g/cm) | | | | | | |
| Testing Tape 1 | 19.4 (216.5) | 15.9 (177.4) | 6.5 (72.5) | 4.2 (46.9) | NM | 3.2 (35.7) | 4.6 |
| Comparative Release Composition B | 4.3 (48.0) | 3.9 (43.5) | 3.9 (43.5) | 3.1 (34.6) | NM | 2.5 (27.9) | 1.4 |
| Comparative Release Composition D | 0.1 (1.1) | 0.1 (1.1) | 0.2 (2.2) | 0.3 (3.3) | NM | 0.4 (4.5) | 0.3 |
| Comparative Release Composition C | 4.3 (48.0) | 5.4 (60.3) | 7.8 (87.0) | 15.5 (173.0) | 15.8 (176.3) | NM | 0.3 |
| EX 7 | 13.6 (151.8) | 15.4 (171.9) | 12.8 (142.8) | 4.4 (49.1) | NM | 4.2 (46.9) | 3.1 |
| EX 14 | 14.1 (157.4) | 7.9 (88.2) | 5.6 (62.5) | 2.7 (30.1) | NM | 2.1 (23.4) | 5.2 |
| EX 15 | 5.7 (63.6) | 2.1 (23.4) | 2.0 (22.3) | 1.8 (20.1) | NM | 1.4 (15.6) | 3.2 |
| EX 17 | 30.0 (334.8) | 27.9 (311.4) | 24.5 (273.4) | 19.7 (219.9) | NM | 4.9 (54.7) | 1.5 |
| EX 4 | 6.9 (77.0) | 11.4 (127.2) | 13.6 (151.8) | 2.2 (24.6) | NM | 1.9 (21.2) | 3.1 |

NM = not measured

Examples 19-21 were prepared by mixing components and amounts according to Table 10. The mixed solutions were then coated and cured according to the C&C Method 1.

Examples 19-21 were tested for release force using the adhesive side of Scotch 812 tape and re-adhesion force to a clean stainless-steel plate according to the Test Methods described above. Results are provided in Table 11:

TABLE 10

Formulations and coating and curing conditions

| Scotch Tape 812 | M180, wt % octadecyl acrylate | EB140, wt % crosslinking monomer | RC711, wt % crosslinking monomer | RC902, wt % crosslinking monomer | A18 initiator, wt % total composition | Paper backing | Coating Thickness, μm | Cylinder volume factor, BCM | Cure Speed, fpm (m/minute) |
|---|---|---|---|---|---|---|---|---|---|
| EX 19 | 91.8 | 8.2 | 0 | 0 | 2 | Easel | 0.5 | 2.5 | 100 (30.48) |
| EX 20 | 91.8 | 8.2 | 0 | 0 | 2 | Easel | 0.5 | 2.5 | 200 (60.96) |
| EX 21 | 83.7 | 8.2 | 0 | 8.2 | 2 | Easel | 0.5 | 2.5 | 60 (18.29) |

TABLE 11

Release force and re-adhesion force results

| Scotch Tape 812 | Release Force, oz/in (g/cm) | | Re-adhesion Force from SS, oz/in (g/cm) | |
|---|---|---|---|---|
| | Initial | 7 days at 50° C. | Initial | 7 days at 50° C. |
| EX 19 | 4.67 | 4.21 | 21.61 | 12.83 |
| EX 20 | 7.63 | 11.96 | 16.06 | 11.97 |
| EX 21 | 0.47 | 1.64 | 19.5 | 18.72 |

Examples 22 and 23 were prepared by mixing components and amounts according to Table 12. The mixed solutions were then coated and cured according to the C&C Method 1.

TABLE 12

Formulations and coating and curing conditions

| | M180, wt % octadecyl acrylate | EB140, wt % crosslinking monomer | Silicone Macromerr | A18 initiator, wt % total composition | Coating Thickness, μm | Cylinder volume factor, BCM | Cure Speed, fpm (m/minute) |
|---|---|---|---|---|---|---|---|
| EX 22 | 84.8 | 8.2 | 5 | 2 | 1 | 5 | 25 |
| EX 23 | 87.3 | 8.2 | 2.5 | 2 | 1 | 5 | 25 |

Comparative Example 7 (uncoated Easel Paper) and Examples 23 and 24 were tested for release force using the adhesive side of Scotch 812 tape and re-adhesion force to a clean stainless-steel plate according to the Test Methods described above. Results are provided in Table 13:

TABLE 13

Release force and re-adhesion force results

| Scotch Tape 812 | Release Force, oz/in (g/cm) | | Re-adhesion Force from SS, oz/in (g/cm) | |
|---|---|---|---|---|
| | Initial | 3 days at 70° C. | Initial | 3 days at 70° C. |
| uncoated Easel paper | 25.61 | Paper Tear | 15.48 | NA |
| EX 23 | 0.35 | 2.12 | 18.20 | 9.92 |
| EX 24 | 0.29 | 1.64 | 17.53 | 10.31 |

What is claimed is:

1. A method of making a release coated article comprising:
   providing a coating composition comprising:
      one or more monomers, each monomer comprising an ethylenically unsaturated group and a terminal alkyl group with at least 18 carbon atoms;
      one or more crosslinking components, each crosslinking component comprising at least two ethylenically unsaturated groups;
      optionally other ethylenically unsaturated monomers, oligomers, or polymers; and
      a polymerization initiator;
   wherein the coating composition comprises at least 50 wt. % of the monomer(s) comprising an ethylenically unsaturated group and a terminal alkyl group with at least 18 carbon atoms that is solid at 25° C. based on the total ethylenically unsaturated monomers, crosslinking components, and when present other ethylenically unsaturated monomers, oligomers, or polymers;
   wherein the coating composition comprises no greater than 1 wt. % of organic solvent;
   applying the coating composition to a surface of a substrate at a temperature above the melting temperature of the coating composition;
   polymerizing the one or more monomer(s) comprising an ethylenically unsaturated group and a terminal alkyl group with at least 18 carbon crosslinking component(s), and when present other ethylenically unsaturated monomers, oligomers, or polymers of the coating composition after applying the coating composition to the substrate, thereby forming a polymerized release coating on the substrate.

2. The method of claim 1 wherein the polymerization initiator is a free-radical initiator.

3. The method of claim 2 wherein the free-radical initiator is a photoinitiator.

4. The method of claim 1 wherein the alkyl group with at least 18 carbon atoms is a linear alkyl group.

5. The method of claim 1 wherein the at least 18 carbon atoms are contiguous.

6. The method of claim 1 wherein the one or more crosslinking components comprises at least one crosslinking component with at least 3 ethylenically unsaturated groups.

7. The method of claim 1 wherein the one or more crosslinking component(s) lacks polydiorganosiloxane moieties.

8. The method of claim 1 wherein the one or more crosslinking component comprises a polydiorganosiloxane backbone.

9. The method of claim 1 wherein the ethylenically unsaturated groups are free-radically polymerizable groups.

10. The method of claim 9 wherein the free-radically polymerizable groups are (meth) acrylate groups.

11. The method of claim 1 wherein the substrate is selected from an organic polymeric film, metal coated film, metallic foil, paper, or fibrous web.

12. The method of claim 1 wherein the step of applying the release coating comprises applying a continuous or discontinuous coating.

13. The method of claim 1 wherein the release coating has a thickness ranging from 0.0025 to 25 grams per square meter.

14. The method of claim 1 wherein the release coating has a melt temperature in a range of 25 to 100° C. after polymerizing.

15. The method of claim 1 wherein when tested with a tape having a 25 micron thick layer of hot melt adhesive comprising a mixture of 100 parts of SIS block copolymer (having a styrene content of 14.3%, a coupling efficiency of 88% and a melt index of 9 g/10 min (condition G)), 85 parts of a C9 modified C5 tackifying resin having a softening point of 87° C. and 2 parts of antioxidant disposed on a 50 micron thick of corona treated biaxial oriented polypropylene film, the polymerized release coating exhibits one or more of the following properties:
   a) an average initial release force of at least 2 oz/in at a peel rate of 2 inches (5 cm)/minutes; and
   b) an average initial release force no greater than 7 oz/in at a peel rate of 300 inches/minutes; and
   c) decreases in release force as the peel rate increases from 2 to 300 inches (5 to 752 cm)/minute.

16. The method of claim 1 wherein the method further comprises coating a pressure sensitive adhesive to the substrate on an opposing surface as the polymerized release coating.

17. The method of claim 16 with the pressure sensitive adhesive comprises at least one polymer selected from an acrylic copolymer, natural rubber, synthetic rubber, or a silicone polymer.

18. The method of claim 16 wherein the release coated article is a tape or a stack of sheets.

19. The method of claim 18 wherein the tape is selected from a book tape, masking tape, packaging tape, electrical tape, foil tape, medical tape or dressing, or splicing tape.

* * * * *